United States Patent Office 3,062,740
Patented Nov. 6, 1962

3,062,740
OIL-IN-WATER EMULSION DRILLING FLUID
William A. Reddie and Eugene R. Werlein, Houston, Tex., assignors to Magnet Cove Barium Corporation, Houston, Tex., a corporation of Arkansas
No Drawing. Filed Apr. 18, 1956, Ser. No. 578,865
33 Claims. (Cl. 252—8.5)

This invention relates to oil-in-water emulsion drilling fluids which are stable in the presence of anhydrite (calcium sulfate) and salt (sodium chloride) and which exhibit superior stability when contaminated with clay or shale. In one of its aspects, the invention relates to such drilling fluids and a method for using the same in drilling through earthen formations having salt or anhydrite therein. In another of its aspects, it relates to a concentrate for preparing such a drilling fluid.

In some oil producing sections, such as west Texas, salt or anhydrite layers or stringers are encountered during the drilling of a well which contaminate the drilling mud to such an extent that the treating costs to maintain conventional muds in a usable condition are very high. In such areas, it has been common practice to drill hard shales and limestone with clear water since these formations do not contribute clay to the drilling fluid. This has resulted in excessive wear of bit bearings and cutters and also in slow drilling rates. To prolong the life of the bits and increase the drilling rates, it has been suggested that emulsion muds stabilized with anionic surfactants be used. Unfortunately, however, the salt and anhydrite contamination of these emulsion muds becomes so extensive that the anionic surfactants form water-insoluble soaps and the emulsion breaks down. Many surface-active agents or emulsifiers, both ionic and non-ionic, have been tried but found to be unsuccessful in such an environment. The problem is even further accentuated by the presence of shale or clay encountered by the mud during the drilling operation. Thus, while a few emulsion systems may seemingly be stable in the presence of salt or anhydrite, the addition of clay or shale causes the emulsions to break down. Thus, the problem is not only one of forming a stable emulsion in an anhydrite salt system but one which is also stable in the presence of shales or clays encountered during the drilling operation.

It is an object of this invention to provide an oil-in-water emulsion drilling fluid which is of superior stability not only in the presence of anhydrite or salt but also when contaminated with shale or clay.

Another object is to provide a particular one of such an emulsion drilling fluid which, when contaminated with clay or shale, causes or permits such clay or shale, upon the emulsion remaining quiescent, to settle to the bottom in a compact layer instead of floating to the top where it would be difficult to separate from the drilling fluid under the influence of gravity alone.

Another object of this invention is to provide such an emulsion drilling fluid to which certain selected emulsification agents or surfactants impart the desired stability and also afford good "spontaneity" during the formation of the emulsion. The term "spontaneity" is used as a measure of the ease with which the emulsion is formed. For example, when a surfactant is mixed with oil and the mixture poured into water, there is good spontaneity if the surfactant-oil mixture easily disperses in the water phase with little or no agitation.

Another object of the invention is to provide a stable oil-in-water emulsion drilling fluid in which a combination of pre-selected phenolic surfactants is employed to impart the desired salt, anhydrite and clay resistant properties to the fluid and which renders the fluid sufficiently stable in the presence of these contaminants to substantially prevent oil from separating out of the emulsion.

Another object of the invention is to provide an oil-in-water emulsion stabilized with certain surfactants so that in the presence of clay or shale, the emulsion exhibits superior fluid loss characteristics even in the absence of conventional fluid loss reducing agents.

Another object is to provide an emulsion well fluid in which surfactants are employed to control the fluid loss properties of the fluid.

Another object of the invention is to provide such a combination of surfactants as a concentrate which can be readily added to water and oil to afford a stable emulsion drilling fluid.

Another object of the invention is to provide a method of drilling a well through salt- or anhydrite-containing formations by which method a superior drilling fluid is circulated through the well to afford improved drilling performance, the fluid comprising an oil-in-water emulsion stabilized with preselected phenolic surfactants.

In general, the objects of this invention are accomplished by employing certain phenols which have been water-solubilized by adding a hydrophilic group thereto. Various combinations of different of these surfactants, along with other ingredients, can be employed to achieve variously desired results, as will be explained in greater detail below.

In accordance with this invention, a preferred formula for forming the emulsion drilling fluid comprises the following active ingredients.

| Ingredient: | Weight percent |
|---|---|
| OX-240 (nonylphenol reacted with 12 mols of ethylene oxide per mol of the nonylphenol) | 47.5 |
| OX-153 1:2 (still bottoms from nonylphenol process reacted with 2 weights of ethylene oxide per weight of still bottoms) | 47.5 |
| Rosin amine D (a primary amine of abietic acid) | 5 |

This preferred formula (by which term it will be designated hereafter) of active ingredients is preferably made up as a concentrate by dissolving or dispersing the same in a suitable solvent. It has been found that ordinary solvents, such as diesel oil, mixed aromatic solvents, etc., are unsatisfactory since one or more of the surfactants crystallize from solution to form a gel or thick paste upon subjecting the mixture to low temperature such as those likely to be encountered in field use of the concentrate. Water, of course, is entirely unsatisfactory. The difficulty in providing a satisfactory solvent seems to arise from the fact that the surfactants, particularly the OX-153 1:2, are not completely soluble in either oil or water but instead have a "borderline" solubility in each. It has been found that benzene and the so-called "diacetone alcohol" are satisfactory solvents or mediums for permanently holding all of these surfactants, particularly the oxyethylated nonylphenol still bottoms, in solution despite low temperatures to which the concentrate may be exposed. Diacetone alcohol can be described chemically as an alcohol-ketone having the formula 4-hydroxy-4-methyl-2-pentanone.

Sufficient solvent should be used to render the surfactants, some of which are pasty liquids, fluid at temperatures likely to be encountered in the oil field. For example, a two-to-one mixture of the preferred formula and solvent is satisfactory. The solution is made by pouring the surfactants and solvent together and then heating the same until a clear solution is obtained.

In making up the drilling fluids of this invention, a preferred procedure is to add the surfactants per se, or a concentrate (solution) thereof to the oil which is to make up a part of the drilling fluid. This mixture is then added to the water with sufficient stirring to give a uniform dispersion of the oil throughout the water. The water phase can be fresh water or that which has already been contaminated with salt or anhydrite, or both. In any case, a satisfactory emulsion will be readily formed.

It is greatly preferred that the emulsion be formed before the water phase has become contaminated to any extent with clays or shales. It has been found that more stable emulsions result if the emulsions are compounded before clay or shale is added rather than after clay or shale has been added. The reason for this distinctive phenomenon is not known but it is through that when clay or shale is added to the water phase before the emulsion is made, the clay or shale hydrates. The hydrated clay or shale seems to interfere with the formation of stable emulsions and to reduce their capacity to withstand clay contamination without breaking down. On the other hand, when clay or shale is added to the emulsion, the clay or shale does not hydrate nearly as much as it does when added to water alone. This being so, the emulsion has a much greater tolerance towards the clay or shale. Stated in another manner, emulsions can withstand much greater concentrations of substantially non-hydrated clay or shale than hydrated clay or shale before the emulsions break down.

While preforming the emulsion before bringing in any clay or shale results in superior emulsions, somewhat better fluid loss characteristics are noted when the clay or shale is hydrated before the emulsion is formed. While this is true, the difference is usually not excessively great and, in any event, fluid loss control can be achieved by conventional fluid loss reducing agents.

In this regard, it has been found that certain surfactants, identified hereafter, will in themselves cause a marked reduction in fluid loss when added with oil to a water base mud. Thus, at least 0.5 lb./bbl. (preferably 1 to 10 lbs./bbl.) of these surfactants, along with 5 to 50 volume percent of oil based on the volme of the water base mud can be added to the water base mud to reduce its fluid loss. This can be done even when the mud is contaminated with anyhdrite or salt. The oil can be diesel oil, crude oil or other types of hydrocarbon oils having medium viscosity characteristics.

It is also possible to form the emulsion drilling fluid by adding the ingredients to the water phase and then bringing in the oil. However, this is not as preferred because it tends to form less stable emulsions having a tendency to foam more than when the reverse procedure is used.

In drilling operations, the drilling fluid of this invention has the ability to increase the rate of drilling as compared with the rate when using water alone as the drilling fluid. This is evidenced by the cuttings being of larger size when the emulsion is used than when using water, the cuttings in the latter case being fine and powdery. Also, the bit life is increased since the emulsion serves to lubricate the bit much better than water does. Further, not only is the drilling fluid resistant to clay or shale, but the clay or shale is substantially non-hydrated so that it settles to the bottom in a comparatively dense, compact layer when the fluid is allowed to remain quiescent. This permits ready separation of the clay or shale drilled up during the drilling operation so that the fluid can be recirculated while carrying a minimum of clay or shale. This feature may be better appreciated when it is understood that other surfactants, when substituted for those of this invention, result in emulsions in which there occurs hydration of the clay which makes it fluffy so that it tends to rise to the top and, in some cases, the emulsion itself breaks.

Although specific materials and concentrations are named above, it has been found that some latitude is possible with respect thereto. This is discussed in the detailed description of this invention which follows.

WATER PHASE

The water phase of the emulsion can vary between rather wide concentration limits but it is preferred that it be present in a much larger proportion than is the oil phase. One reason for this is that less of the relatively expensive oil and surfactants are required per barrel of drilling fluid. Also, as the water concentration is decreased and the oil concentration increased, the additional benefits derived from the fluid become marginal so that as a practical matter, the additional cost tends to outweigh the added advantages. Thus from a practical standpoint, it is preferred that the water be present in a concentration within the range of 97% to 50% (by volume) of the combined volume of the oil and water. More preferably, the water is present within the range of 95% to 80% of such combined volume. In those cases where a lightweight emulsion is desired to combat lost circulation problems, the water concentration is decreased even to 50% or less so that lost circulation is prevented even though the oil concentration is higher than may be desired from a purely emulsion standpoint.

As indicated above, the drilling fluid of this invention is particularly useful where the drilling is to proceed through salt or anhydrite, or both, deposits as well as through hard shale and limestone. It has been found that the fluid can be compounded originally from either fresh water or water which has been contaminated with salt or anhydrite or both. Thus, in some instances, fresh water may be available and, if desired, the emulsion can be made up with this and then the filling proceeded with through the salt and anhydrite formations. On the other hand, salt- or anhydrite-contaminated water may be in the mud pits and this can be used to form the emulsion.

In many operations, the water phase may have various concentrations of anhydrite therein. These concentrations may range from a very low figure to saturation. The fluid of this invention is capable of achieving superior results with any of these concentrations of anhydrite and, in some instances, the presence of anhydrite actually increases the emulsion fluid's resistance to clays or shale.

As indicated above, salt (sodium chloride) may also contaminate or be present in the fluid of this invention without substantial adverse results. However, increasing the amount of salt present tends to decrease the stability of the emulsion and its resistance to clay solid contamination. Thus, for example, the addition of salt to systems where the water phase is saturated with anhydrite somewhat reduces the clay tolerance of the systems even though salt water itself tends to reduce the hydration of clays or shales. This may be due in part to the fact that salt increases the solubility of anhydrite in water, thereby increasing the amount of inorganic ions present in the system to such an extent as to reduce the efficiency of the surfactants or emulsifiers. While salt thus does have a deleterious effect upon the emulsions of this invention, it is surprising that it has as little effect as it does. For example, salt can be present in a concentration substantially less than saturation without substantially reducing the stability of the emulsions or their resistance to clay. However, as the concentration of the salt proceeds toward saturation, the clay tolerance is reduced so that with water saturated with salt and anhydrite, only a pound or two of clay per barrel of fluid can be tolerated. Accordingly, where high clay concentrations are to be encountered, it is desirable to limit the salt concentration to be substantially less than saturation. As will be seen hereafter, shales, as distinguished from clays, generally have less adverse effect on the emulsion fluids than do many types of clays. Accordingly, higher salt concentrations can be tolerated with shales than with clays. The water phase of this invention, insofar as anhydrite is concerned, can contain enough anhydrite to be between ten percent (10%) and one hundred percent (100%) saturated therewith and usually will be substantially (50 to 100%) saturated. As to salt, the water can contain from zero to saturation amounts thereof and usually will contain at least one percent (1%) of salt by weight of the water. Of course, a typical water will contain both of these materials.

SURFACTANTS

Surfactants for Imparting Clay Tolerance

In general, it has been found that different classes of surfactants vary widely in each class's ability to impart clay tolerance to oil-in-water emulsions, particularly in the presence of anhydrite or salt. Further, it has been found that the class of surfactants which imparts this superior clay tolerance will also form superior emulsions even in the absence of clay. However, clay or shale will always be encountered in a drilling operation and the emulsions will effectively hinder its hydration.

In practice it has been found that a class of surfactants, comprising certain phenolic compounds which have been reacted with hydrophilic groups, are satisfactory to stabilize and impart clay tolerance to an emulsion of the type containing one or both of salt and anhydrite. It is preferred to select the surfactant, or mixtures thereof, from the class comprising:

(a) Phenol-oxyalkylene adduct where about 30 mols of the oxyalkylene are present per mol of phenol;
(b) Monoalkylphenol- and polyalkylphenol-oxyalkylene adducts, and admixtures thereof such as certain still bottoms, where the alkyl groups are of certain chain length and the amount of oxyalkylene adducted is enough to render the surfactant molecule sufficiently water-soluble that it will migrate to the oil-water interface;
(c) Sulfonated alkylphenol-oxyalkylene adducts likewise containing an amount of oxyalkylene to cause migration to the oil-water interface; and
(d) Higher molecular weight naphthenic acid-oxyalkylene adducts.

Taking up the surfactants by the sub-classes set out above, the phenol-30-mol oxyalkylene adduct can be represented by the formula:

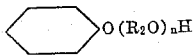 (I)

where $R_2O$ is an ethylene oxide or, less preferably, a propylene oxide group and $n$ is at least 28 and preferably is 30. The compound can be prepared in the same manner as described below for reacting nonylphenol with ethylene oxide.

As to the second sub-class broadly identified above, the monoalkylphenol-oxyalkylene adducts can be represented by the formula:

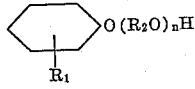 (II)

where $R_1$ is an alkyl group connected to the phenylene group and having from 4 to 14, preferably 8 to 12, carbon atoms, $R_2O$ is an oxyalkylene such as oxyethylene or oxypropylene, and $n$ is an integer in the range of 6 to 50. It is preferred that $n$ be of increasing value as $R_1$ increases from 4 to 14 and preferably it should be about 20 to 30. Thus, $n$ should be large enough, compared with the number of carbon atoms in $R_1$, that enough water solubility is imparted to the surfactant that it will migrate to the oil-water interface. Further, $n$ usually should be made larger for oxypropylene than for oxyethylene. It will be appreciated that in any given mass of surfactant, different molecules of the alkylphenol my have different numbers of $R_2O$ groups attached thereto so that $n$ here is really the average number of $R_2O$ groups for a large number of alkylphenol molecules.

Exemplary of this class of alkyl phenolic surfactants is nonylphenol which has been reacted with an amount of ethylene oxide selected from the range of from eight to fifty mols of ethylene oxide per mol of nonylphenol. One such surfactant averaging 12 mols of ethylene oxide per mol of nonylphenol is sold under the trade name OX-240. In making this surfactant, propylene is polymerized to provide a polymer containing a very high percentage of the nine-carbon chain trimer. This trimer is then reacted with phenol in the presence of a catalyst, such as sulfuric acid or boron trifluoride. There results a mixture of alkylated phenols which is distilled to produce an overhead product comprising nonylphenol. The nonyl group is a branched chain such as a 3,4,5 methyl hexyl group. Whether or not the nonyl group is straight or branched chain does not seem to affect this invention. The separation of the nonylphenol from the other products is conducted at a temperature of at 200° C. and at a vacuum of 15 to 30 mm. There results a still bottoms which will be discussed in detail below.

The nonylphenol thus separated is then reacted with ethylene oxide in the presence of suitable catalyst, the amount of ethylene oxide present being controlled so that the reaction product, on the average, has a desired amount of ethylene oxide reacted therewith; that is, an amount selected from the range of eight to fifty mols of ethylene oxide per mol of nonylphenol. The addition of a lesser number of groups results in a surfactant too oleophilic to satisfactorily stabilize the emulsion. In addition to ethylene oxide or oxyethylene, other oxyalkylene groups as oxypropylene can be employed as well as mixtures of different oxyalkylenes.

Alkylphenols other than nonylphenol can be made and treated with oxyalkylene in the manner described above. Among the other monoalkylphenols which may be adducted with oxyalkylene (ethylene or propylene oxide) so that the adduct will increase the clay tolerance of and stabilize the oil-in-water emulsions of this invention are, by way of example, amylphenol, butylphenol, hexylphenol, octylphenol, dodecylphenol and he like. While most of these phenols are produced in the ortho and para forms, the metal forms are also useful. Also, the alkyl chains can be straight or branched so as to include the sec- and tert-forms such as secondary butylphenol, tertiary butylphenol, tertiary octylphenol and the like.

As explained above, the alkylate from the reaction of phenol with an alkylene is distilled to yield an alkylphenol overhead product and a still bottoms. The still bottoms generally comprises a mixture of alkylphenol and dialkylphenol and in some instances will also include a higher boiling residue which may contain polymerized phenols, high boiling alkylates of phenols, complex benzene compounds, and the like. The still bottoms from a nonylphenol process will usually contain from about 15% to about 30% of nonylphenol with the balance being dinonylphenol and residue. The residue may vary from less than 1% to as high as 20%.

To provide another surfactant useful in accordance with this invention, the still bottoms from the alkylphenol separation step can be reacted with an oxyalkylene, such as oxyethylene or oxypropylene to increase its water solubility. However, in this case, a larger amount of the oxyethylene is preferably used than in the case of the alkylphenol discussed above since the phenolic groups, considered as a whole, have a higher average content of hydrophobic alkyl groups connected thereto than does the alkylphenol. Thus, it is preferred that the amount of oxyalkylene reacted be in the range of 2 to 4, preferably 3 to 4, weights per weight of still bottoms. In the most preferred forms of this surfactant, the oxyalkylene will be present within the upper part of the above ranges. Here again, oxyethylene is preferred although oxypropylene can be employed if desired.

The resulting adduct comprises a mixture of such monoalkylphenol adduct, of the type above discussed, and a polyalkylphenol adduct which can have the formula

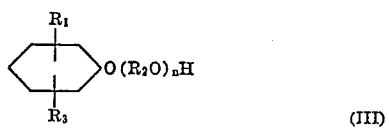

(III)

where $R_1$ and $R_3$ are alkyl groups each having 4 to 14 carbon atoms and having a total in all such groups of 8 to 28 carbon atoms, $n$ is an integer and $R_2O$ is an oxyalkylene group. In many instances, $R_1$ and $R_3$ will have equal numbers of carbon atoms. Of course, $n$ is selected so that the total weight of oxyalkylene reacted with the still bottoms (total reacted with the dialkyl- and monoalkylphenols) is within the above weight range and increases within such range as $R_1$ and $R_3$ increase in their total carbon atom content. A particularly preferred adduct is nonylphenol still bottoms adducted with 3 weights of ethylene oxide per weight of still bottoms. It will be understood that the still bottoms adducts usable in this invention are not limited to the nonylphenol still bottoms adducts but can comprise other adducts derived from the manufacture of alkylphenols of the type discussed with reference to Formula II above. In each such instance, the still bottoms can be derived by distilling the alkylate derived from the alkylation of phenol with a selected alkylene or equivalent meeting the definition of $R_1$ in Formula II. The still bottoms can then be adducted with oxyalkylene as described above with respect to nonylphenol. Thus, there can be adducts of butylphenol still bottoms, hexylphenol still bottoms, octylphenol still bottoms, dodecylphenol still bottoms and the like. In some cases, the percent of the monoalkylphenol present in the still bottoms may vary from the 15 to 30 percent range stated above.

In addition to mixtures of mono- and polyalkylphenols as above discussed, polyalkylphenol-oxyalkylene adducts may be used alone. Representative of such compounds is the following general formula:

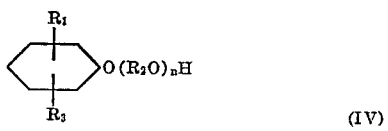

(IV)

where $R_1$ and $R_3$ are alkyl groups each having at least one carbon atom but together having from 3 to 28 carbon atoms, $R_2O$ is an ethylene or propylene oxide group and $n$ is an integer in the range of 12 to 50. $R_1$ and $R_3$ can be separate alkyl groups or they can be a single group connected as a ring to adjacent phenylene carbon atoms as in the indanols. Here again, $n$ should increase as the total carbon atoms in $R_1$ and $R_3$ increase but in most instances, a value of $n$ in the range of 20 to 40 will be satisfactory. Exemplary of this sub-class of compounds are the oxyalkylene adducts of dibutylphenol, diamylphenol, dioctylphenol, dinonylphenol, didodecyl phenol and the like, as well as mixed alkyl group phenols such as butylamylphenol, methylnonylphenol, ethylhexylphenol, butylnonylphenols, octyldodecylphenols, and the like. Also falling in this class are the "high boiling phenols" which are a mixture of alkyl phenols, a predominant portion of which are meta-substituted and also including

| | Percent |
|---|---|
| 4-indanol | 15 |
| 5-indanol | 15 |
| 3-methyl 5-ethyl phenol | 10 |
| n-Propyl phenols | 5–10 |
| Other alkyl phenols | [1] 50–55 |

[1] Mostly meta substituted.

Such a mixture has, in a typical production sample, the following properties:

| | |
|---|---|
| Average molecular weight | 140 |
| Apparent specific gravity | 1.03 |
| Boiling range (ASTM D–850): | |
| IBP | °C 240 |
| 1% | °C 242 |
| 5% | °C 245 |
| 50% | °C 250 |
| 95% | °C 270 |
| DP | °C 280 |

Refractive index at 25° C. 1.543.

In addition to the still bottoms and alkylphenol-oxyalkylene surfactants described above, it has been found that sulfonated alkylphenol-alkoxylene adducts have a marked ability to impart tolerance of oil-in-water emulsions toward clay solids. Except that they are more expensive that the above discussed nonylphenol and dinonylphenol surfactants, they would be preferred. As an example of this class of compounds may be mentioned the ammonium salt of a sulfonated ethylene oxide adduct with nonylphenol. Such a compound can be made by reacting the nonylphenol with ethylene oxide and thereafter reacting the resulting adduct with sulfamic acid (amino acid sulfite). This compound can have the following chemical formula:

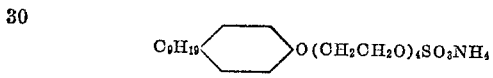

Another method of making the compound is to react the ethylene oxide-nonylphenol adduct with sulfur trioxide to form the sulfonic acid derivative. This derivative can then be neutralized with an amine to form the amine derivative or with caustic soda or ammonia, or other base, to form the corresponding derivatives.

Surfactants in this general class can be represented by the formula:

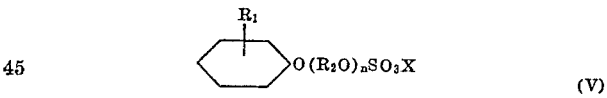

(V)

where $R_1$ is one or more alkyl groups containing a total of 6 to 14 carbon atoms, $R_2O$ is an oxyalkylene group selected from the class comprising oxyethylene and oxypropylene, $n$ is an integer having a value in the range of 4 to 30 and X is a cation such as ammonium, sodium, potassium, amine, etc. Examples of this class of surfactants are the sulfonated alkoxylene adducts of hexylphenol, octylphenol, heptylphenol, dodecylphenol, methylhexylphenol, ethylnonylphenol, propylbutylphenol, propyloctylphenol and the like.

The surfactants conforming to the above general formula can be made by the same process as described with respect to the ammonium salt of sulfonated nonylphenol-ethylene oxide adduct.

When this sulfonated surfactant is employed in systems having relatively low clay concentrations, e.g. below seven pounds per barrel, the amount of oxyalkylene employed can be within the range of 4 to 30 mols per mol of the sulfonated alkylphenol. However, when higher clay concentrations, e.g. above five pounds per barrel, are to be used, the amount of oxyalkylene should generally be in the lower part of this range, say, from 4 to 12 mols per mol of the sulfonated alkylphenol-oxyalkylene adduct. It has been observed that this compound becomes more efficient for its intended purpose as the amount of oxyalkylene is reduced through the above range. Thus, the 4-mol adduct of sulfonated nonylphenol is more efficient in causing the emulsion to be clay tolerant than is a 10-mol adduct. This is in contradistinction to the nonyl and still bottoms adducts. In these it has been found that their efficiency increases as the amount of oxyalkylene is increased.

Another sub-class of surfactants for increasing the clay tolerance of the emulsions of this invention are the oxyalkylene adducts of high molecular weight naphthenic acids. These acids have one carboxyl group per molecule and contain two to five saturated interconnected rings per molecule. They can occur as many possible types such as

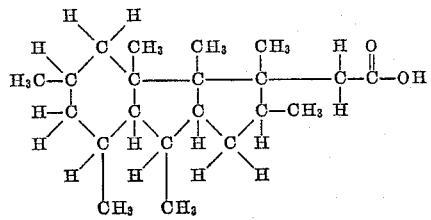
[VI]

These acids should have a molecular weight in the range of 300 to 350 and an acid number of 160 to 190. They can include a benzene ring and mixture of 5 and 6 carbon atom saturated rings. The oxyalkylene groups substitute in the hydroxyl group of the carboxyl radical similar to the phenols described above. The amount of oxyalkylene should be from 15 to 50 mols per mol of naphthenic acid.

*Surfactants for Imparting Spontaneity*

In order to improve the appearance of the emulsions as they are formed, and also the ease with which they are formed, it is sometimes desirable to add a surfactant having the property of causing the emulsions to be easily formed even though it, in itself, is not particularly effective in stabilizing the same. Thus, as a general rule, the class of surfactants described above as imparting clay tolerance to emulsions do not have as much "spontaneity" as may be desired. It has been found that the surfactants of the above described sub-classes but having less oxyalkylene adducted therewith will generally impart good spontaneity when used with the clay-tolerance imparting surfactants. In a sense then, the more oil soluble surfactants are used to improve spontaneity. Among the compounds which can be used for this purpose are:

(1) The dialkylphenol-oxyethylene adducts represented by the formula

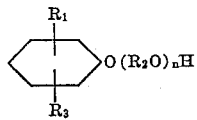

when $R_1$, $R_3$ and $R_2O$ are as above described for Formula IV and $n$ is an integer having a value in the range of 10 to 14. Thus, dinonylphenols which have been reacted with about 10 to 14 mols of ethylene oxide per mol of dinonylphenol are satisfactory. Other examples of the phenolic radical are named above in respect of Formula IV.

(2) More preferably, still bottoms from an alkylphenol producing process as above described which have been recated with about 1 to 2 weights of oxyalkylene, such as ethylene oxide or propylene oxide, per weight of still bottoms. Such surfactants will impart even greater spontaneity than the dialkylphenol type. Satisfactory surfactants of this type are OX–153 1:1 and OX–153 1:2 which are still bottoms derived from a nonylphenol process are above described reacted respectively with 1 and 2 weights of ethylene oxide per weight of still bottoms. OX–153 1:2 is preferred.

The amount of this type of surfactant (spontaneity producing) which can be employed should be in the range of 10 to 50, preferably 30 to 50, weight percent of the total active surfactants present. Increasing the amount beyond this range tends to cause oil to separate from the emulsion.

*Corrosion-Inhibiting Surfactants*

It has been found that when emulsions of the type described are used in the field, severe corrosion can result to bits and other drilling equipment. To inhibit this, a cationic surfactant having corrosion-inhibiting powers is added to the emulsion. In the preferred formula, Rosin Amine D is used for this purpose. This compound is described as the primary amine of abietic acid, the latter being derived from tall oil. It is thought to have the following formula:

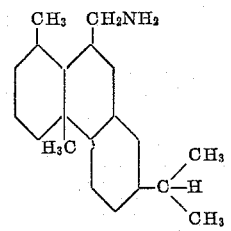
(VII)

The amount of the corrosion-inhibiting surfactant should be in the range of 2% to 10% by weight of the total surfactants present.

The amount of clay-tolerance imparting surfactants will, of course, be in the range of 88 to 40, preferably 68 to 40, weight percent of the total active surfactants.

With surfactant concentrations in the above range, the total amount of surfactants employed to form the oil-in-water emulsion should be at least 3 and preferably at least 5 weight percent of the oil phase employed. Higher concentrations than these minimums do not harm the emulsions but too high concentrations are uneconomical.

As used in this specification and claims, an emulsion formed of a "major" amount of water and a "minor" amount of oil means that both water and oil are present with the concentration of the water being 50 percent or greater than the oil being 50 percent or less of the combined water-oil volume. Also, when it is stated that water, oil or a water-oil emulsion contains one or both of sodium chloride (salt) or calcium sulfate (anhydrite), it is meant that such compounds are present in an amount which is significant under the conditions which a drilling mud is used. Further, where reference is made to oxyalkylene herein, ethylene oxide (oxyethylene), propylene oxide (oxypropylene) or admixtures thereof are meant although it is possible to use higher alkyl oxides by using more of them to form the adduct.

*Illustrative Data*

To demonstrate the effect of varying the concentrations of different surfactants, the tests reported in Table I were run. For these tests, the various surfactants were combined in the weight percentages indicated and a concentrate made by causing a crude temporary dispersion of the surfactants in an aromatic hydrocarbon. The amount of hydrocarbon used was sufficient that its weight constituted 30% of the final concentrate. One pound per barrel of the concentrate was then mixed with enough diesel oil that when the oil was added to water, its volume constituted 8% of the total oil-water volume. As indicated in the table, various types of water were used. In the first column of results, 4% of sodium chloride by weight of the water was added thereto, along with sufficient calcium sulfate to saturate the same. In the second column the salt was omitted and the water saturated with calcium sulfate.

TABLE I

| Surfactants, percent [1] | | | | | | 4% salt, sat. anhydrite water | | | |
|---|---|---|---|---|---|---|---|---|---|
| OX-240 | OX-153 1:1 | OX-153 1:2 | Adduct N-2 | 6126 | RAD | Spontaneity | Emulsion | Foam | Oil |
| 90 | ------ | ------ | 5 | ------ | 5 | Good | Good | U | 0 |
| ------ | 90 | ------ | 5 | ------ | 5 | ----do---- | ----do---- | VS | 7.0 |
| ------ | ------ | 90 | 5 | ------ | 5 | ----do---- | ----do---- | S | T |
| 45 | 45 | ------ | 5 | ------ | 5 | ----do---- | ----do---- | U | 2.0 |
| 45 | ------ | 45 | 5 | ------ | 5 | ----do---- | ----do---- | U | 0 |
| 42.5 | ------ | 42.5 | ----- | 15 | --- | ----do---- | ----do---- | U | T |
| ------ | 42.5 | 42.5 | ----- | 15 | --- | Fair | Very good | VS | 1.0 |
| 10 | 40 | 40 | 7 | ------ | 3 | Good | Good | S | T |
| 85 | ------ | ------ | ----- | 15 | --- | Poor | ----do---- | S | T |
| ------ | 85 | ------ | ----- | 15 | --- | Good | Very weak | VS | 8.0 |
| ------ | ------ | 85 | ----- | 15 | --- | Very good | Very good | S | T |

| Sat. anhydrite water | | | | Fresh water | | | |
|---|---|---|---|---|---|---|---|
| Spontaneity | Emulsion | Foam | Oil | Spontaneity | Emulsion | Foam | Oil |
| Good | Fair | S | 0 | Poor-fair | Good | S | T |
| Do | Good | VS | 4.0 | Good | ----do---- | VS | T |
| Do | Very good | S | T | Very good | ----do---- | S | 0 |
| Do | Good | S | 0.2 | Good | ----do---- | U | T |
| Do | ----do---- | VU | T | ----do---- | ----do---- | S | T |
| Do | ----do---- | S | 0 | ----do---- | ----do---- | S | 0 |
| Fair-good | ----do---- | S | T | ----do---- | ----do---- | S | 0 |
| Good | Very good | S | T | ----do---- | ----do---- | S | 0 |
| Fair | Good | S | T | Fair | ----do---- | S | 0 |
| Good | Very good | S | 1.5 | Good | Very good | S | T |
| Very good | Good | S | T | Very good | Good | S | P |

[1] OX-240, OX-153 1:1, and OX-153 1:2 are as identified above. Adduct N-2 is nonylphenol adducted with 2 mols of ethylene oxide per mol of nonylphenol.

At this point, the test procedures employed will be explained. The observations of "spontaneity" indicate the ease with which the diesel oil-surfactant mix spread through the water when poured thereinto. If the spreading was rapid and there was little tendency for the oil to segregate from the water after it was poured thereinto, the spontaneity was considered to be good. If the oil tended to rapidly rise to the surface of the water as a separate layer and very little emulsion was formed when the oil was poured into the water, the spontaneity was considered to be poor. Other degrees of spontaneity were noted as fair or very good.

Under the columns labeled "Emulsion," the appearance of the emulsion was noted. Those emulsions which had a rich creamy appearance were noted as good or very good. Emulsions which appeared thin were termed weak or very weak, depending upon their appearance. Emulsions of intermediate appearance were, of course, labeled fair.

Under the column labeled "Foam," the amount of foam appearing on the emulsion after agitation on a Hamilton Beach mixer for 5 minutes at 60 volts was noted. This measurement was made by having one barrel equivalent (350 ml.) of the emulsion in a one-quart Kerr Mason jar and then beating as above noted. The foam was measured and its height reported as a percentage of the height of liquid in the jar. In Table I the following notations are used:

"S"—Foam height was 30% to 40% of liquid height.
"U"—Foam height was 40% to 50% of liquid height.
"VS"—Foam height was less than 30% of liquid height.
"VU"—Foam height was greater than 50% of liquid height.

Under the column labeled "Oil," the amount of oil which broke free from the emulsion after standing for 24 hours is reported. If only a thin film was reported, the amount of was reported as a trace (T). Amounts greater than this were measured in percentage of total volume of the emulsion. Referring to Table I, it will be seen that when the concentration of OX-153 1:1 was high, considerable oil broke from the emulsion, and this is particularly true where the water phase contained both salt and anhydrite. Emulsions containing high percentages of OX-153 1:2 had the same tendency but to a markedly less extent. High concentrations of OX-240 resulted in stable emulsions insofar as oil break-out was concerned. It will also be noted that when OX-240 and OX-153 1:1 were used in equal proportions, the high concentration of the latter also caused oil to break out. This is not true where OX-153 1:2 was substituted for the OX-153 1:1. Accordingly, it can be concluded that OX-153 1:1 has a deleterious effect upon emulsions insofar as oil break-out is concerned. It will also be noted that emulsions with high concentrations of OX-240 were somewhat lacking in spontaneity. However, the spontaneity was improved by the addition of Adduct N-2, OX-153 1:1 or more preferably OX-153 1:2.

A series of tests similar to those reported in Table I were run but using two pounds per barrel of the various surfactant-solvent mixes and in general the results were the same except that the emulsions containing high concentrations of OX-240 exhibited greater clay tolerance than at low concentrations, whereas those wtih high concentrations of OX-153 1:1 did not appreciably change in clay tolerance. Emulsions high in OX-153 1:2 did not appreciably change in clay tolerance in the salt- anhydrite systems but did increase somewhat in the anhydrite and fresh-water systems.

In the tests reported in Table I, a low yield, calcium montmorillonite type of clay was used. This clay had a particularly severe effect upon the emulsions and to demonstrate the less severe effect of shales expected to be encountered in the drilling of wells, there was secured a sample of shale from a well in which the drilling fluids of this invention would be used. Tests were then run with various surfactants to determine the effect of shale upon emulsions made therefrom. These tests are reported in Table II. In the tests, the water phase consisted of water saturated with calcium sulfate and containing 4% by weight of sodium chloride. Diesel oil in an amount sufficient to provide 8% of the volume of water was added to the water, which had previously been treated with one-half pound per barrel of surfactant. The mixture was stirred for five minutes at 60 volts on a Hamilton Beach mixer and then allowed to stand for five minutes, after which observations were made. However, in the instance reported in the third column, the observation was made after 24 hours of standing. Increasing amounts of the finely ground shale were added as indicated in the table.

termed "emulsion." Since the cream is a rich emulsion and the "emulsion" is a leaner emulsion, the height of the cream layer is a measure of the stability of the emulsion. In other words, the salt-anhydrite water is much heavier than oil and the difference in gravity is such that oil-rich emulsion tends to rise to the top of the oil-lean

TABLE II

| Surfactant | No shale | | | | 10 lb./bbl. shale | | | | |
|---|---|---|---|---|---|---|---|---|---|
| | Foam | Cream | Oil | Emulsion | Foam | Cream | Oil | Emulsion | C.O.B. |
| OX-191 | 4/16″ | 1/16″ | None | Good | 3/16″ | 3/16″ | None | Good | 4/16″ |
| 50% OX-372, 50% OX-374 | 4/16″ | 1/16″ | ...do... | ...do... | 3/16″ | 2/16″ | ...do... | ...do... | 4/16″ |
| OX-240 | 4/16″ | 2/16″ | ...do... | ...do... | 3/16″ | 3/16″ | ...do... | ...do... | 3/16″ |

| Surfactant | 10 lb./bbl. shale—24 hrs. | | | | 12 lb./bbl. shale | | | |
|---|---|---|---|---|---|---|---|---|
| | Foam | Cream | Emulsion | C.O.B. | Foam | Cream | Emulsion | C.O.B. |
| OX-191 | 1/16″ | 3/16″ | Good | 4/16″ | 2/16″ | 3/16″ | Good | 4/16″ |
| 50% OX-372, 50% OX-374 | 3/16″ | 2/16″ | ...do... | 4/16″ | 3/16″ | 1/16″ | ...do... | 4/16″ |
| OX-240 | 2/16″ | 3/16″ | ...do... | 4/16″ | 1/16″ | 3/16″ | ...do... | 4/16″ |

| Surfactant | 14 lb./bbl. shale | | | | 16 lb./bbl. shale | | | |
|---|---|---|---|---|---|---|---|---|
| | Foam | Cream | Emulsion | C.O.B. | Foam | Cream | Emulsion | C.O.B. |
| OX-191 | 3/16″ | 3/16″ | Good | 4/16″ | 3/16″ | 3/16″ | Good | 4/16″ |
| 50% OX-372, 50% OX-374 | | Clay flocced to top | | | | | | |
| OX-240 | 4/16″ | 2/16″ | Good | 4/16″ | 2/16″ | 4/16″ | Good | 4/16″ |

| Surfactant | 18 lb./bbl. shale | | | | 20 lb./bbl. shale | | | | |
|---|---|---|---|---|---|---|---|---|---|
| | Foam | Cream | Emulsion | C.O.B. | Foam | Cream | Oil | Emulsion | C.O.B. |
| OX-191 | 3/16″ | 3/16″ | Good | 4/16″ | 3/16″ | 1/16″ | None | Fair | 5/16″ |
| 50% OX-372, 50% OX-374 | | | | | | | | | |
| OX-240 | 2/16″ | 3/16″ | Good | 4/16″ | 3/16″ | 1/16″ | None | Good | 5/16″ |

| Surfactant | 22 lb./bbl. shale | | | | 24 lb./bbl. shale | | | | |
|---|---|---|---|---|---|---|---|---|---|
| | Foam | Cream | Oil | Emulsion | C.O.B. | Foam | Cream | Oil | Emulsion | C.O.B. |
| OX-191 | 3/16″ | Flocced clay present | | | 4/16″ | | | | | |
| 50% OX-372, 50% OX-374 | | | | | | | | | | |
| OX-240 | 3/16″ | 1/16″ | None | Fair | 5/16″ | Clay flocced to top and bottom | | | | |

Note.—OX-191 is nonylphenol reacted with 30 mols of ethylene oxide, OX-372 is a dico benzyl chloride quaternary reported to have the formula

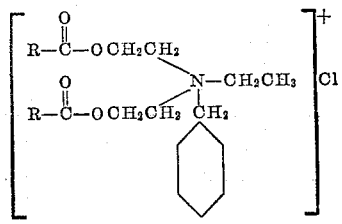

Where R is the alkyl groups of coco fatty acids (mixtures of 10, 12 and 14 carbon atom alkyl groups); OX-374 is a fatty acid fraction derived from tall oil (less than 1% rosin acid) adducted with 30 mols of ethylene oxide.

In this table, the height of foam and cream are reported in inches. In making these measurements, one barrel equivalent of the emulsion (350 cc.) was poured into a one-quart Kerr Mason jar and the foam and cream measured. After standing, it was observed that at least three separate phases would occur in most instances. The topmost phase was foam. Below this foam was a layer termed "cream." It comprised a rich layer of emulsion which had separated from the next lower phase, which was "emulsion." The term "C.O.B." is the measurement of the amount of clay (or shale) settling to the bottom of the Mason jar. All measurements were taken after the emulsion had stood for 24 hours.

From the table it will be observed that the OX-191 and the OX-240 showed excellent tolerance toward shale whereas the mixture of OX-372 and -374 showed a much lesser tolerance.

As indicated above, the amount of oxyalkylenes added to the phenolic radical determines the water-solubility of the resulting compound. This has an effect upon the ability of emulsions formed therefrom to withstand contamination by clay. This is demonstrated in Table III. For the first three surfactants, 2 lbs./bbl. of the surfactant were added to enough diesel oil to yield an emulsion of 8% oil. The mixture was then added to water saturated with anhydrite and containing 4% by weight of salt. For the last three surfactants, the procedure was reversed by adding the surfactant to the water and then bringing in the oil.

ity to clay. While from a purely clay resistable standpoint, it would be preferable to use nonylphenols having 20 to 30 mols of ethylene oxide reacted therewith, such cause more foaming than those with lesser amounts of the oxide. As a result, the lower alkoxy compounds will be used where clay contamination is not expected to exceed the "limit" for the particular compound.

The test results reflected in Table IV further demonstrate the effect of adding different amounts of ethylene oxide to phenolic radicals. In these tests, 1 lb./bbl. of surfactant was dispersed in diesel oil, after which the mixture was added to the water. The amount used was enough to yield an 8% oil emulsion.

TABLE III

| Surfactant [1] | 10 lb./bbl. clay | | | | | 15 lb./bbl. clay | 17 lb./bbl. clay | 20 lb./bbl. clay |
|---|---|---|---|---|---|---|---|---|
| | Foam | Cream | Oil | Emulsion | C.O.B. | | | |
| 8 mol | 0 | 0 | | Good | C.F.T.T. | C.F.T.T. | | |
| 10 mol | 0 | 1/16″ | | do | Yes | Clay flocced—Emulsion fair. | | |
| 12 mol | 0 | 1/16″ | | do | Yes | Clay flocced—No emulsion. | | |
| 15 mol | 0 | 3/16″ | | do | Yes | C.O.B.—Fair emulsion | C.O.B.—Fair emulsion | Clay flocced—2″ C.O.B., water separated. |
| 20 mol | 1 3/16″ | 3/16″ | | Fair | Yes | do | do | Do. |
| 30 mol | −1″ Total | | | do | Yes | do | do | C.O.B.—Not flocced, fair emulsion. |

It will be observed that as the amount of ethylene oxide added is increased, the emulsion shows increased resistiv- TABLE IV
Fresh Water

| Surfactant [1] | No clay | | | | | 3 lb./bbl. clay | | | | |
|---|---|---|---|---|---|---|---|---|---|---|
| | Spontaneity | Emulsion | Foam [2] | Cream [2] | Oil [2] | Foam | Cream | Oil | Emulsion | C.O.B. |
| DP-6 | Good | Good | 3 | 2 | 2 | CFTT [3] | | | Weak | |
| DP-9 | do | do | 4 | 2 | 1.5 | CFTT [3] | | | do | |
| DP-12 | Very good | Very good | 5 | 3 | 1 | CFTT [3] | | | Good | |
| NP | None | Poor | 5 | 2 | 6 | 1/16″ | 1/16″ | 0 | Fair | 3/16″ |
| OX-153 1:2 | Good | Good | 21 | 3 | T | 2/16″ | 0 | T | Good | 3/16″ |
| OX-240 | Poor | Fair to good | 15 | 6 | T | 1/16″ | 0 | T | do | 3/16″ |
| OX-153 | Fair | Good | 15 | 1 | T | 1/16″ | 2/16″ | 0 | do | 2/16″ |

| Surfactant | 5 lb./bbl. clay | | | | | 7 lb./bbl. clay | | | | |
|---|---|---|---|---|---|---|---|---|---|---|
| | Foam | Cream | Oil | Emulsion | C.O.B. | Foam | Cream | Oil | Emulsion | C.O.B. |
| DP-12 | Emulsion very weak | | | 1 1/16″ clay on top | | | | | | |
| NP | 1/16″ | 2/16″ | 0 | Fair | 3/16″ | 1/16″ | Clay semi-flocced | | | 2/16″ |
| OX-153 1:2 | 2/16″ | 1/16″ | 0 | Good | 3/16″ | 3/16″ | 1/16″ | 0 | Good | 3/16″ |
| OX-240 | 2/16″ | 0 | T | do | 3/16″ | 1/16″ | 1/16″ | 0 | do | 1/16″ |
| OX-153 1:3 | 1/16″ | 1/16″ | T | do | 3/16″ | 1/16″ | 1/16″ | T | do | 3/16″ |

| Surfactant | 9 lb./bbl. clay | | | | | 11 lb./bbl. clay | | | | |
|---|---|---|---|---|---|---|---|---|---|---|
| | Foam | Cream | Oil | Emulsion | C.O.B. | Foam | Cream | Oil | Emulsion | C.O.B. |
| NP | Clay semi-flocced | | | 2/16″ | | Clay semi-flocced | | | | 2/16″ |
| OX-153 1:2 | CFTT & B [4] | | | | | | | | | |
| OX-240 | CFTT & B [4] | | | | | | | | | |
| OX-153 1:3 | 3/16″ | 1/16″ | 0 | Fair | 3/16″ | CFTB [5] | | | | |

TABLE IV—Continued

Water Saturated With Anhydrite

| Surfactant | No clay | | | | | 3 lb./bbl. clay | | | | |
|---|---|---|---|---|---|---|---|---|---|---|
| | Sponta-neity | Emul-sion | Foam | Cream | Oil | Foam | Cream | Oil | Emul-sion | C.O.B. |
| DP-6 | Fair | Fair | 2 | 0 | 6 | CFTT³ | | | Weak | |
| DP-9 | Good | do | 2 | 1 | 6 | CFTT³ | | | do | |
| DP-12 | do | Good | 7 | 5 | T | CFTT³ | | | Good | |
| NP | None | None | 15 | 0 | 7 | CFTT & B⁴ | | | Weak | |
| OX-153 1:2 | Good | Good | 15 | 0 | 5 | 2/16″ | 0 | T | Good | 3/16″ |
| OX-240 | Poor | Fair | 14 | 8 | T | 1/16″ | 3/16″ | T | Fair | 3/16″ |
| OX-153 1:3 | Fair | Good | 10 | 4 | T | 3/16″ | 0 | 0 | Good | 1/16″ |

| Surfactant | 5 lb./bbl. clay | | | | | 7 lb./bbl. clay | | | | |
|---|---|---|---|---|---|---|---|---|---|---|
| | Foam | Cream | Oil | Emul-sion | C.O.B. | Foam | Cream | Oil | Emul-sion | C.O.B. |
| DP-6 | | | | | | | | | | |
| DP-9 | | | | | | | | | | |
| DP-12 | | | | | | | | | | |
| NP | | | | | | | | | | |
| OX-153 1:2 | 3/16″ | 1/16″ | 0 | Good | 4/16″ | CFTT³ | | | None | |
| OX-240 | 2/16″ | 3/16″ | T | Fair | 3/16″ | 1/16″ | 3/16″ | T | Fair | 3/16″ |
| OX-153 1:3 | 2/16″ | 0 | T | Good | 2/16″ | 2/16″ | 0 | T | Good | 3/16″ |

| Surfactant | 9 lb./bbl. clay | | | | | 11 lb./bbl. clay | | | | |
|---|---|---|---|---|---|---|---|---|---|---|
| | Foam | Cream | Oil | Emul-sion | C.O.B. | Foam | Cream | Oil | Emul-sion | C.O.B. |
| OX-153 1:2 | CFTT & B⁴ | | | Fair | | | | | | |
| OX-240 | | | | do | 2/16″ | CFTT⁴ | | | | |
| OX-153 1:3 | 1/16″ | 1/16″ | 0 | do | 2/16″ | | | | None | |

4% Salt Water Saturated With Anhydrite

| Surfactant | No clay | | | | | 3 lb./bbl. clay | | | | |
|---|---|---|---|---|---|---|---|---|---|---|
| | Spontaneity | Emul-sion | Foam² | Cream² | Oil² | Foam | Cream | Oil | Emul-sion | C.O.B. |
| DP-6 | Fair | Poor | 6 | 2 | 7 | CFTT³ | | | Weak | |
| DP-9 | do | Fair | 2 | 1 | 7 | CFTT³ | | | do | |
| DP-12 | Good | Good | 10 | 0 | 1 | CFTT³ | | | Good | |
| NP | None | None | 6 | 0 | 8 | CFTT & B⁴ | | | None | |
| OX-153 1:2 | Good | Good | 16 | 7 | T | 1/16″ | 1/16″ | T | Good | 4/16″ |
| OX-240 | Poor | Fair | 14 | 7 | T | 1/16″ | 3/16″ | T | Fair | 3/16″ |
| OX-153 1:3 | Fair to poor | Good | 8 | 5 | T | 3/16″ | 3/16″ | 0 | Good | 2/16″ |

| Surfactant | 5 lb./bbl. clay | | | | | 7 lb./bbl. clay | | | | |
|---|---|---|---|---|---|---|---|---|---|---|
| | Foam | Cream | Oil | Emul-sion | C.O.B. | Foam | Cream | Oil | Emul-sion | C.O.B. |
| DP-6 | | | | | | | | | | |
| DP-9 | | | | | | | | | | |
| DP-12 | | | | | | | | | | |
| NP | | | | | | | | | | |
| OX-153 1:2 | CFTT³ | | | Weak | | | | | | |
| OX-240 | 2/16″ | 1/16″ | T | Fair | 3/16″ | CFTT & B | | | Poor | |
| OX-153 1:3 | 3/16″ | 1/16″ | 0 | Good | 3/16″ | 3/16″ | 1/16″ | 0 | Good | 3/16″ |

| Surfactant | 9 lb./bbl. clay | | | | |
|---|---|---|---|---|---|
| | Foam | Cream | Oil | Emulsion | C.O.B. |
| DP-6 | | | | | |
| DP-9 | | | | | |
| DP-12 | | | | | |
| NP | | | | | |
| OX-153:1:2 | | | | | |
| OX-240 | | | | | |
| OX-153:1:3 | CFTT | | | None | |

¹ DP-6, -9, and -12 are dinonylphenols adducted with 6, 9 and 12 mols of ethylene oxide respectively; NP is nonylphenol; OX-153 1:3 is the same as OX-153 1:2 except that 3 weights of ethylene oxide are reacted with each weight of still bottoms.
² Values taken as milliliters in a 100 ml. sample of emulsion fluid including cream, foam and oil.
³ Clay flocced to top.
⁴ Clay flocced to top and bottom.
⁵ Clay flocced to bottom.

From this table it will be seen that the particular dinonylphenol-ethylene oxide adducts resulted in emulsions having substantially no tolerance to clay. Since the dinonylphenol with 12 mols of ethylene oxide corresponds to OX-240 except that the formula contains an additional nonyl group, it is thought that the hydrophobic tendencies of this surfactant exceed its hydrophilic tendencies to a degree not permitting it to satisfactorily stabilize the emulsion. However, it should be noted that nonylphenol was made up into an emulsion containing 8% of diesel oil by volume and 92% of water saturated with anhydrite and containing 4% by weight of salt.

TABLE V

| Surfactant [1] | No clay | | | | 5 lb./bbl. clay | | | | |
|---|---|---|---|---|---|---|---|---|---|
| | Foam, percent [2] | Cream, percent [2] | Oil | Emulsion | Foam, in. | Cream, in. | Oil | Emulsion | C.O.B., in. |
| DM | 22 | 8 | T | Good | 1/16 | 3/16 | T | Good | 3/16 |
| 4 mol | 39 | 7 | T | Fair | 1/16 | 3/16 | T | do | 4/16 |
| 8 mol | 44 | 6 | T | do | 2/16 | 3/16 | T | do | 4/16 |
| 12 mol | 65 | 4 | 0 | Fair to weak | 4/16 | 3/16 | 0 | Fair | 3/16 |
| 20 mol | 28 | 8 | 0 | Fair | 4/16 | 3/16 | 0 | do | 3/16 |
| 30 mol | 37 | 8 | 0 | do | 3/16 | 3/16 | 0 | Fair to good | 3/16 |
| M-1 | 40 | 6 | T | do | 2/16 | 3/16 | 1/16 | do | 3/16 |
| M-2 | 59 | 6 | T | Fair to weak | 1/16 | 3/16 | T | Fair | 4/16 |

| Surfactant [1] | 8 lb./bbl. clay | | | | | 11 lb./bbl. clay | | | | |
|---|---|---|---|---|---|---|---|---|---|---|
| | Foam, in. | Cream, in. | Oil | Emulsion | C.O.B., in. | Foam, in. | Cream, in. | Oil | Emulsion | C.O.B., in. |
| DM | 2/16 | 3/16 | 0 | Good | 3/16 | CFTT | | | | |
| 4 mol | 1/16 | 3/16 | 0 | do | 4/16 | 1/16 | 4/16 | 0 | Fair to good | 5/16 |
| 8 mol | 2/16 | 3/16 | 0 | do | 4/16 | 2/16 | 4/16 | 0 | do | 4/16 |
| 12 mol | 3/16 | 3/16 | 0 | Fair | 4/16 | 3/16 | 4/16 | 0 | Fair | 5/16 |
| 20 mol | 4/16 | 4/16 | 0 | Fair to weak | 4/16 | CFTT & B | | | | |
| 30 mol | 3/16 | 4/16 | 0 | Fair | 5/16 | CFTT & B | | | | |
| M-1 | Clay flocced in cream | | 1/16 | Fair to weak | 4/16 | Clay semi-flocced | | | | |
| M-2 | 3/16 | 4/16 | 0 | Fair | 3/16 | Clay semi-flocced | | | | |

| Surfactant [1] | 14 lb./bbl. clay | | | | |
|---|---|---|---|---|---|
| | Foam, in. | Cream, in. | Oil | Emulsion | C.O.B., in. |
| DM | | | | | |
| 4 mol | 1/16 | 3/16 | 0 | Good | 5/16 |
| 8 mol | 2/16 | 3/16 | 0 | do | 5/16 |
| 12 mol | 3/16 | 3/16 | 0 | Clear | 7/16 |
| 20 mol | | | | | |
| 30 mol | | | | | |
| M-1 | | | | | |
| M-2 | | | | | |

[1] DM is a 67-33 mixture by weight of OX-240 and aromatic hydrocarbons; 4 mol to 30 mol indicates the ammonium salt of sulfonated nonylphenol having the indicated mols of ethylene oxide adducted therewith; M-1 is a mixture of 80% of the 4 mol ammonium salt compound plus 20% of sorbitol esterified with 1.3 mols of tall oil per mol of sorbitol and having 18 mols of ethylene oxide adducted therewith; M-2 is the same except the 8 mol ammonium salt compound is used instead of the 4 mol.
[2] Percent of original liquid height.

per se resulted in emulsions (with fresh water phase only) which were superior in their clay tolerance compared to the dinonylphenol-ethylene oxide adduct emulsions.

It will also be noted from Table IV that the OX-153 1:3 results in emulsions superior to those containing OX-153 1:2. Other tests, not reported herein, show that OX-153 1:1 is considerably inferior to either of OX-153 1:2 or OX-153 1:3. It is thought that the reason for this is that the increased amount of ethylene oxide added to the still bottoms renders the latter more water-soluble and hence of more efficiency in the emulsion.

Table V reports results on tests showing the clay tolerance of the ammonium salt of sulfonated nonylphenol-ethylene oxide adducts to which has been added varying amounts of ethylene oxide as indicated. In running these tests, one and a half pounds per barrel of a commercial form of this salt (which is 65% active material) was made up into an emulsion containing 8% of diesel oil by volume and 92% of water saturated with anhydrite and containing 4% by weight of salt.

From this table, it will be seen that as the amount of ethylene oxide which is present in the sulfonated compound is increased, the resistance of the resulting emulsions to clay is reduced. Best resistance seems to be yielded by the 4 to 8 mol adducts. It will also be seen that the sulfonated compound containing the smaller amounts of ethylene oxide is superior to OX-240 in imparting clay resistance to emulsions.

In Table VI, various phenol adduct surfactants were tested in 4% salt water saturated with anhydrite. One lb./bbl. of the surfactants was added to enough diesel oil that when the resulting mixture was added to the water, 8% by volume of oil was present. Clay was then added in increments until the clay flocced. In each use, an emulsion was formed but the spontaneity was either very poor (OX-438) or none (all the other surfactants).

TABLE VI

| Surfactant | | Emulsion | Clay, lbs./bbl. | |
|---|---|---|---|---|
| Trade name | Chemical name [1] | | Amt. added with no floccing | Amt. required to floc |
| OX-431 | Amylphenol+30 | Fair | 5 | 7 |
| OX-433 | Resorcinol+30 | Weak [2] | 0 | 3 [3] |
| OX-434 | Resorcinol+60 | Very weak. | 0 | 3 |
| OX-438 | High molecular weight naphthenic acid+30. | Fair-good. | 7 | 9 |
| OX-444 | Di-sec-butylphenol+30 | Fair | 5 | 7 |
| OX-445 | Meta-isopropylphenol+30 | Weak | 0 | 3 [3] |
| OX-447 | Para-isopropylphenol+30 | ---do | 0 | 3 |
| OX-448 | Cresylic acid+30 | ---do [2] | 0 | 3 |
| OX-449 | Cresylic acid "FF"+30 | ---do [2] | 0 | 3 |
| OX-451 | Para-cresol+30 | ---do [2] | 0 | 3 |
| OX-452 | Cyclohexanol+30 | ---do [2] | 0 | 3 |
| OX-455 | Catechol+60 | ---do | 0 | 3 |
| OX-463 | Beta-naphthol+30 | Fair [2] | 0 | 3 |
| OX-489 | Aniline+30 | Weak [2] | 0 | 3 |
| OX-490 | Ortho-sec-butylphenol+30. | Fair | 7 | 9 |
| OX-491 | Para-sec-butylphenol+30 | ---do | 5 | 7 |
| OX-492 | 2,4,di-tert-butylphenol+30. | ---do | 7 | 9 |
| OX-495B | Ortho-chlorophenol+30 | ---do | 0 | 3 |
| OX-496 | Para-tert-butylphenol+30. | ---do | 5 | 7 |
| OX-497 | Tris (α methyl benzyl) phenol+30. | ---do | 5 | 7 |
| OX-498 | Para-chlorophenol+30 | ---do | 0 | 3 |
| OC-60022 | Meta-aminophenol+30 | ---do | 3 | 5 |
| OPE-30 | Tert-octylphenol+30 | ---do | 3 | 5 |
| FB-2688 | Dinonylphenol+30 | ---do | 7 | 9 |
| FB-2689 | Dodecylphenol+30 | ---do | 5 | 7 |
| OX-191 | Nonylphenol+30 | ---do | 7 | 9 |
| OX-242 | Meta-phenol+30 [4] | Weak-fair. | 0 | 3 |
| OX-450 | High boiling phenols+30 | Fair | 0 | 3 [3] |
| OX-440 | Furfuryl alcohol+30 | ---do [2] | 0 | 3 |
| OX-504 | Ortho-cresol+30 | ---do [2] | 0 | 3 |
| OX-505 | Cresylic acid D-4-A+30 | ---do [2] | 0 | 3 |
| OX-506 | Cresylic acid D-2-B+30 | ---do [2] | 0 | 3 |
| OX-507 | Meta-phenol 220+50 [4] | ---do [2] | 0 | 3 |

[1] Term indicates basic phenol, etc. and the number indicates mols of ethylene oxide adducted therewith.
[2] Appreciable free oil broke out upon aging overnight.
[3] With this much clay, floccing had started but was not great.
[4] Meta-cresols are reported to be mixtures of methyl-, ethyl- and propyl-phenols.

From the table, it will be seen that short chain alkyl phenol adducts, such as cresol, do not impart clay tolerance when adducted with the amount of ethylene oxide reported in the table.

Another series of tests were run in the same manner as those reported in Table VI. They are reported in Table VII.

a mixture of methylphenol, ethylphenol and propylphenol.

The effect of the preferred formula upon the fluid loss of emulsions containing shale, with and without a fluid loss reducing agent, is shown in Table VIII. The results in this table were obtained from emulsions containing 30% by volume of diesel oil, water saturated with anhydrite and containing 900 p.p.m. of $Cl^-$ plus 1.43 lb./bbl. of the preferred formula. The amount of shale employed was 15 lb./bbl. and it was obtained from a well in West Texas where salt and anhydrite stringers were encountered. 1 lb./bbl. of carboxymethyl cellulose (CMC) was used as indicated. Aging was overnight.

In the Order I mixing, the shale was added to fresh water and the mixture aged. Then the preferred formula and oil were added and the emulsion aged. After the properties had been measured, the CMC was added and aged and properties again measured. In the Order II mixing, the emulsion was first formed and then the shale added. After this mixture had aged and its properties measured, CMC was added. In the Order III mixing, the emulsion was formed and driscose added. After aging, the properties were measured and then shale added.

TABLE VIII

| Mixing order | Immediate properties | | | Aged properties | | |
|---|---|---|---|---|---|---|
| | App. visc. cp. | Yield point | F.L. | App. visc. cp. | Yield point | F.L. |
| I | 6 | 0 | 37 | 8 | 0 | 11 |
| I plus CMC | 39 | 12 | 4.6 | 39 | 22 | 3.3 |
| II | | | | 6 | 0 | 15.4 |
| II plus CMC | | | | 41 | 30 | 4.2 |
| III | | | | 25 | 20 | 14 |
| III plus shale | | | | 24 | 8 | 5.0 |

From this table, it can be seen that the surfactants per se have a marked ability to reduce fluid loss. Thus, with no fluid loss agent (CMC) present, the surfactants caused a fluid loss reduction from 37 cc. to 11 cc. after time had been allowed for them to interact with the shale. Also, better fluid loss reduction was obtained when the shale was permitted to hydrate prior to forming the emulsion.

To further demonstrate the fluid loss reducing characteristics of certain surfactants, the tests reported in Table IX were run. In these tests, 15 lb./bbl. of shale was added to water saturated with anhydrite and containing 900 p.p.m. of $Cl^-$. The shale-water mixture was then aged

TABLE VII

| Surfactant | Spontaneity | Foam, percent of liquid height | Cream, percent of liquid height | Oil, percent of liquid | Emulsion | Clay | | | |
|---|---|---|---|---|---|---|---|---|---|
| | | | | | | 3 lb./bbl. | 5 lb./bbl. | 7 lb./bbl. | 9 lb./bbl. |
| OX-240 (nonylphenol adducted with 12 mols ethylene oxide). | Poor | 37 | 10 | 0 | Good | C.O.B. | C.O.B. | C.O.B. | C.F.T.T. |
| OC-50731 (phenol adducted with 12 mols ethylene oxide). | Fair | 100 | 0 | 8 | None | | | | |
| OX-191 (nonylphenol adducted with 30 mols ethylene oxide). | ---do | 50 | 10 | 0 | Fair | C.O.B. | C.O.B. | C.O.B. | C.F.T.T. |
| OX-377 (phenol adducted with 30 mols ethylene oxide). | ---do | 75 | 8 | 0 | ---do | C.O.B. | C.O.B. | C.F.T.T. | |
| OX-259 (nonylphenol adducted with 20 mols ethylene oxide). | ---do | 50 | 10 | 0 | ---do | C.O.B. | C.O.B. | C.O.B. | C.F.T.T. |
| OC-5073L (phenol adducted with 20 mols ethylene oxide). | None | 112 | 0 | 4 | None | | | | |
| OX-372 (meta-phenol adducted with 15 mols ethylene oxide). | Fair | 112 | 0 | 4 | ---do | | | | |
| OX-242 (meta-phenol adducted with 30 mols ethylene oxide). | None | 87 | 3 | 0 | Fair | C.F.T.T. | | | |

It will be seen that phenol adducted with 30 mols of ethylene oxide imparted some clay tolerance to the emulsions whereas phenol adducted with 12 or 20 mols of ethylene oxide did not. Meta-phenol with 30 mols of ethylene oxide also failed. Meta-phenol is reported to be overnight. Then the indicated surfactant was added along with enough diesel oil to give an emulsion having 30% by volume of oil, the mixture agitated and aged overnight. Properties were then measured. CMC was then added (1 lb./bbl.) and the emulsion aged overnight.

TABLE IX

| Agent | Lb./bbl. | Emulsion without CMC | | Emulsion with CMC | |
|---|---|---|---|---|---|
| | | App. visc. | F.L. | App. visc. | F.L. |
| OX-240 | 1 | 3 | 11.2 | 42 | 2.7 |
| OX-240 | 3 | 5 | 3.8 | 42 | 1.1 |
| OX-240 | 5 | 5 | 3.2 | 45 | 1.2 |
| OX-240 | ½ } | 4 | 9.0 | 42 | 3.6 |
| OX-153 1:2 | ½ } | | | | |
| OX-153 1:2 | 1 | 5 | 13.0 | 39 | 3.2 |
| OX-191 | 1 | 6 | 20.4 | 38 | 2.0 |
| OX-438 | 1 | 6 | 11.1 | 45 | 2.9 |
| OX-490 | 1 | 7 | 189 | 39 | 3.4 |
| OX-518 | 1 | 3 | 31 | 35 | 5.3 |
| OX-521 | 1 | 7 | 69 | 40 | 5.1 |
| OX-534 | 1 | 6 | 126.6 | 43 | 4.3 |
| FB-2688 | 1 | 6 | 16 | 39 | 2.1 |
| Teox 120 | 1 | 6 | 13 | 38 | 5.1 |
| Amm. salt | 1 | 5 | 21 | 38 | 3.4 |

OX-240: Nonylphenol adducted with 12 mols ethylene oxide.
OX-153 1:2: Still bottoms from nonylphenol process adducted with 2 weights of ethylene oxide per weight of still bottoms.
OX-191: Nonylphenol adducted with 30 mols of ethylene oxide.
OX-438: Naphthenic acids adducted with 30 mols of ethylene oxide.
OX-490: Ortho-sec-butyl phenol adducted with 30 mols ethylene oxide.
OX-518: Dodecyl phenol adducted with 12 mols ethylene oxide.
OX-521: Naphthenic acids adducted with 12 mols ethylene oxide, the acids being as identified above, i.e. high molecular weight naphthenic acids.
OX-534: Ortho-sec-butyl phenol adducted with 12 mols ethylene oxide.
FB-2688: Dodecyl phenol adducted with 30 mols ethylene oxide.
Teox 120: Tall oil adducted with 12 mols ethylene oxide.
Amm. salt: Sulfonated adduct of nonylphenol with 4 mols of ethylene oxide.

Tests using the preferred formula, anhydrite-saturated water containing 900 p.p.m. of Cl⁻, 15 lb./bbl. of shale but no oil resulted in total fluid loss.

In Table X, there is shown a comparison of results obtained when using 12 and 30 mol. ethylene oxide adducts of various phenolic materials. These results were obtained using an emulsion comprising water saturated with anhydrite and containing 4% by weight of NaCl, 8% by volume of diesel oil and 1 lb./bbl. of the indicated surfactant. With regard to the figures under "Clay Tolerance," the first figure states the lbs./bbl. of clay the emulsion could tolerate without the clay floccing and the second figure is the lbs./bbl. of clay required to cause the clay to floc or the emulsion to break.

TABLE X

| Surfactant | Spontaneity | Emulsion | Clay tolerance |
|---|---|---|---|
| Dinonylphenol plus 12 E.O [1] | Good | Good | 0-3 |
| Dinonylphenol plus 30 E.O | None | Fair | 7-9 |
| Dodecylphenol plus 12 E.O | Fair | do | 5-7 |
| Dodecylphenol plus 30 E.O | None | do | 5-7 |
| Paratert amylphenol plus 12 E.O | do | do | 5-7 |
| Paratert amylphenol plus 30 E.O | do | do | 5-7 |
| Naphthenic acid plus 12 E.O | Good | Good | 0-3 |
| Naphthenic acid plus 30 E.O | None | Fair-good | 7-9 |
| Nonyl phenol plus 12 E.O | Fair | Fair | 7-9 |
| Nonyl phenol plus 30 E.O | None | do | 7-9 |
| o-Sec-butyl phenol plus 12 E.O | do | do | 5-7 |
| o-Sec-butyl phenol plus 30 E.O | do | do | 5-7 |
| p-Sec-butyl phenol plus 12 E.O | do | do | 5-7 |
| p-Sec-butyl phenol plus 30 E.O | do | do | 5-7 |
| di-Sec-butyl plus 12 E.O | do | do | 3-5 |
| di-Sec-butylphenol plus 30 E.O | do | do | 5-7 |

[1] E.O.—Ethylene oxide.

From the foregoing it will be seen that this invention is one well adapted to attain all of the ends and objects hereinabove set forth, together with other advantages which are obvious and which are inherent to the composition and process.

It will be understood that certain features and subcombinations are of utility and may be employed without reference to other features and subcombinations. This is contemplated by and is within the scope of the claims.

The invention having been described, what is claimed is:

1. An oil-in-water emulsion well drilling fluid comprising a minor amount of oil dispersed in a major amount of water substantially saturated with calcium sulfate and containing at least 1 percent by weight of sodium chloride, said emulsion being stabilized by at least one surfactant present in an amount of at least 0.5 pound per barrel and selected from the group consisting of: (a) phenol adducted with at least 28 mols of an oxyalkylene per mol of phenol; (b) a monoalkylphenol adducted with 6 to 50 mols of an oxyalkylene per mol of monoalkylphenol, the alkyl group of the latter having from 4 to 14 carbon atoms; (c) a polyalkylphenol adducted with 12 to 50 mols of an oxyalkylene per mol of polyalkylphenol, the alkyl groups of the latter each having at least one carbon atom and together having from 3 to 28 carbon atoms; (d) a mixture of a monoalkylphenol and polyalkylphenol adducted with 2 to 4 weights of oxyalkylene per weight of said mixture, the alkyl groups of the monoalkylphenol and the polyalkylphenol each having 4 to 14 carbon atoms; (e) a sulfonated alkylphenol-oxyalkylene adduct containing 4 to 30 mols of oxyalkylene per mol of alkylphenol, the alkyl groups of the alkylphenol containing 6 to 14 carbon atoms; and (f) a naphthenic acid adducted with 15 to 50 mols of oxyalkylene per mol of naphthenic acid, the latter having a molecular weight in the range of 300 to 350; said oxyalkylene adducted with the selected surfactant being selected from the groups consisting of oxyethylene and oxypropylene and mixtures thereof.

2. The emulsion fluid of claim 1 wherein said surfactant is nonylphenol adducted with 6 to 50 mols of said oxyalkylene.

3. The emulsion fluid of claim 1 wherein said surfactant comprises a mixture of nonylphenol and dinonylphenol adducted with 2 to 4 weights of said oxyalkylene per weight of said mixture.

4. The emulsion fluid of claim 1 wherein said surfactant comprises a sulfonated nonylphenol-oxyalkylene adduct containing 4 to 30 mols of said oxyalkylene per mol of nonylphenol.

5. The emulsion fluid of claim 1 wherein said surfactant comprises a mixture of nonylphenol adducted with 6 to 50 mols of said oxyalkylene and nonylphenol still bottoms adducted with about 2 weights of said oxyalkylene per weight of said still bottoms, the latter comprising a mixture of nonylphenol and dinonylphenol.

6. An oil-in-water emulsion well drilling fluid comprising a minor amount of oil dispersed in a major amount of water containing at least one of sodium chloride and calcium sulfate, said emulsion containing and being stabilized by at least 0.5 pound per barrel of a phenol adducted with at least 28 mols of an oxyalkylene selected from the group consisting of oxyethylene and oxypropylene and mixtures thereof.

7. An oil-in-water emulsion well drilling fluid comprising a minor amount of oil dispersed in a major amount of water containing at least one of sodium chloride and calcium sulfate, said emulsion containing and being stabilized by at least 0.5 pound per barrel of a monoalkylphenol adducted with 6 to 50 mols of oxyalkylene per mol of monoalkylphenol, the alkyl group of the latter having from 4 to 14 carbon atoms and said oxyalkylene being selected from the group consisting of oxyethylene and oxypropylene and mixtures thereof.

8. The emulsion fluid of claim 7 wherein the amount of oxyalkylene adducted with said monoalkylphenol is selected to be in the upper part of said 6 to 50 mol range when the number of carbon atoms in said alkyl group is selected to be in the upper part of said 4 to 14 carbon atom range and vice versa.

9. The emulsion fluid of claim 7 wherein said monoalkylphenol is nonylphenol.

10. An oil-in-water emulsion well drilling fluid comprising a minor amount of oil dispersed in a major amount of water containing at least one of sodium chloride and calcium sulfate, said emulsion containing and being stabilized by at least 0.5 pound per barrel of a polyalkylphenol adducted with 12 to 50 mols of oxyalkylene per mol of polyalkylphenol, the alkyl groups of the latter having at least one carbon atom per group and a total for all groups of 3 to 28 carbon atoms, said oxyalkylene being selected from the group consisting of oxyethylene and oxypropylene and mixtures thereof.

11. An oil-in-water emulsion well drilling fluid comprising a minor amount of oil dispersed in a major amount of water containing at least one of sodium chloride and calcium sulfate, said emulsion containing and being stabilized by at least 0.5 pound per barrel of a mixture of monoalkylphenol and polyalkylphenol adducted with 2 to 4 weights of oxyalkylene per weight of said mixture, the alkyl groups of the monoalkylphenol and the polyalkylphenol each having 4 to 14 carbon atoms, said oxyalkylene being selected from the group consisting of oxyethylene and oxypropylene and mixtures thereof.

12. The emulsion fluid of claim 11 said mixture of monoalkylphenol and polyalkylphenol is a still bottoms derived by fractionating an alkylate product from a phenol-alkylene alkylation step, said still bottoms containing about 15 to 30 percent of said monoalkylphenol with a major portion of the balance being dialkylphenol.

13. An oil-in-water emulsion well drilling fluid comprising a minor amount of oil dispersed in a major amount of water containing at least one of sodium chloride and calcium sulfate, said emulsion containing and being stabilized by at least 0.5 pound per barrel of a sulfonated alkylphenol-oxyalkylene adduct containing 4 to 30 mols of oxyalkylene per mol of alkylphenol, the alkyl group containing 6 to 14 carbon atoms and the oxyalkylene being selected from the group consisting of oxyethylene and oxypropylene and mixtures thereof.

14. The emulsion fluid of claim 13 wherein the amount of oxyalkylene adducted with said alkylphenol is within the range of 4 to 12 mols of oxyalkylene per mol of alkylphenol.

15. The emulsion fluid of claim 14 wherein said alkylphenol is nonylphenol.

16. An oil-in-water emulsion well drilling fluid comprising a minor amount of oil dispersed in a major amount of water containing at least one of sodium chloride and calcium sulfate, said emulsion containing and being stabilized by at least 0.5 pound per barrel of a naphthenic acid adducted with 15 to 50 mols of oxyalkylene per mol of naphthenic acid, the latter having a molecular weight in the range of 300 to 350 and said oxyalkylene being selected from the group consisting of oxyethylene and oxypropylene and mixtures thereof.

17. The emulsion fluid of claim 16 wherein said naphthenic acid has an acid number in the range of 160 to 190.

18. An oil-in-water emulsion well drilling fluid comprising a minor amount of oil dispersed in a major amount of water substantially saturated with calcium sulfate and containing at least 1 percent by weight of sodium chloride, said emulsion containing and being stabilized by a first surfactant, comprising at least one surfactant present in an amount of at least 0.5 pound per barrel and selected from the group consisting of: (a) phenol adducted with at least 28 mols of an oxyalkylene per mol of phenol; (b) a monoalkylphenol adducted with 6 to 50 mols of an oxyalkylene per mol of monoalkylphenol, the alkyl group of the latter having from 4 to 14 carbon atoms; (c) a polyalkylphenol adducted with 12 to 50 mols of an oxyalkylene per mol of polyalkylphenol, the alkyl groups of the latter each having at least one carbon atom and together having from 3 to 28 carbon atoms; (d) a mixture of a monoalkylphenol and polyalkylphenol adducted with 2 to 4 weights of oxyalkylene per weight of said mixture, the alkyl groups of the monoalkylphenol and the polyalkylphenol each having 4 to 14 carbon atoms; (e) a sulfonated alkylphenol-oxyalkylene adduct containing 4 to 30 mols of oxyalkylene per mol of alkylphenol, the alkyl groups of the alkylphenol containing 6 to 14 carbon atoms; and (f) a naphthenic acid adducted with 15 to 50 mols of oxyalkylene per mol of naphthenic acid, the latter having a molecular weight in the range of 300 to 350; said emulsion having the spontaneity with which it is formed improved by having therein a second surfactant having a greater oil solubility than said first surfactant, and selected from the group consisting of: (a) a dialkylphenol adducted with from 10 to 14 mols of an oxyalkylene per mol of dialkylphenol, the alkyl groups of the latter each having at least one carbon atom and together having from 3 to 28 carbon atoms; and (b) a mixture of monoalkylphenol and dialkylphenol adducted with 1 to 2 weights of oxyalkylene per weight of said mixture, said mixture comprising a still bottoms derived by fractionating an alkylate product from a phenol-alkylene alkylation step, the still bottoms containing about 15 to 30 percent of said monoalkylphenol with a major portion of the balance being dialkylphenol, the alkyl groups of the monoalkylphenol and the dialkylphenol each having 4 to 14 carbon atoms; said oxyalkylene being selected from the group consisting of oxyethylene and oxypropylene and mixtures thereof; said second surfactant being present in an amount within the range of 10 to 50 weight percent of the total weight of said one and said second surfactants present in the fluid.

19. The emulsion fluid of claim 18 wherein said surfactant for improving the spontaneity is said still bottoms mixture adducted with about 2 weights of said oxyalkylene per weight of said still bottoms mixture.

20. The emulsion fluid of claim 19 wherein said still bottoms mixture comprises nonylphenol and dinonylphenol.

21. An oil-in-water emulsion well drilling fluid comprising a minor portion of oil dispersed in a major portion of water containing at least one of sodium chloride and calcium sulfate, said emulsion containing and being stabilized with a mixture of surfactants comprising: at least 0.5 pound per barrel of a monoalkylphenol adducted with 6 to 50 mols of oxyalkylene per mol of monoalkylphenol, the alkyl group of the monoalkylphenol having from 4 to 14 carbon atoms; and a mixture of monoalkylphenol and dialkylphenol adducted with 1 to 2 weights of oxyalkylene per weight of said mono- and dialkylphenol mixture, the latter comprising a still bottoms derived by fractionating an alkylate product from a phenol-alkylene alkylation step; the alkyl groups of the still bottoms mixture each having 4 to 14 carbon atoms; said oxyalkylene being selected from the group consisting of oxyethylene and oxypropylene and mixtures thereof; the still bottoms adduct mixture being present in an amount within the range of 10 to 50 weight percent of the total weight of the still bottoms adduct mixture and the monoalkylphenol adduct.

22. The emulsion fluid of claim 21 wherein said alkylphenols are nonylphenol and said dialkylphenol is dinonylphenol.

23. In a method of drilling a well through earthen formations containing at least one of sodium chloride and calcium sulfate, wherein a drilling fluid is circulated through a drill string, the improvement which comprises passing through the drill string and in contact with said formations a drilling fluid comprising an oil-in-water emulsion of a minor amount of oil in a major amount of water stabilized by at least 0.5 pound per barrel of a surfactant selected from the group consisting of: (a) phenol adducted with at least 28 mols of an oxyalkylene per mol of phenol; (b) a monoalkylphenol adducted with 6 to 50 mols of an oxyalkylene per mol of monoalkylphenol, the alkyl group of the latter having from 4 to 14 carbon atoms; (c) a polyalkylphenol adducted with 12 to 50 mols of an oxyalkylene per mol of polyalkylphenol, the alkyl groups of the latter each having at least one carbon atom and together having from 3 to 28 carbon atoms; (d) a mixture of a monoalkylphenol and polyalkylphenol adducted with 2 to 4 weights of oxyalkylene per weight of said mixture, the alkyl groups of the monoalkylphenol and polyalkylphenol each having 4 to 14 carbon atoms; (e) a sulfonated alkylphenol-oxyalkylene adduct containing 4 to 30 mols of oxyalkylene per mol of alkylphenol, the alkyl group of the alkylphenol containing 6 to 14 carbon atoms; and (f) a naphthenic acid adducted with 15 to 50 mols of oxyalkylene per mol of naphthenic acid, the latter having a molecular weight in the range of 300 to 350; said oxyalkylene adducted with the selected surfactant being selected from the group consisting of oxyethylene and oxypropylene and mixtures thereof, said emulsion having been formed and stabilized before any substantial quantity of clay or shale is suspended therein by virtue of the drilling operation.

24. The method of claim 23 wherein said surfactant is nonylphenol adducted with 6 to 50 mols of said oxyalkylene.

25. The method of claim 23 wherein said surfactant comprises a mixture of nonylphenol and dinonylphenol adducted with 2 to 4 weights of said oxyalkylene per weight of said mixture.

26. The method of claim 23 wherein said surfactant comprises a sulfonated nonylphenol-oxyalkylene adduct containing 4 to 30 mols of said oxyalkylene per mol of nonylphenol.

27. The method of claim 23 wherein said surfactant comprises a mixture of nonylphenol adducted with 6 to 50 mols of said oxyalkylene and nonylphenol still bottoms adducted with about 2 weights of said oxyalkylene per weight of said still bottoms, the latter comprising a mixture of nonylphenol and dinonylphenol.

28. In a method of drilling a well through earthen formations containing at least one of sodium chloride and calcium sulfate wherein a drilling fluid is circulated through a drill string, the improvement which comprises passing through the drill string and in contact with said formations a drilling fluid comprising an oil-in-water emulsion of a minor amount of oil in a major amount of water stabilized by a mixture of surfactants comprising: at least 0.5 pound per barrel of a monoalkylphenol adducted with 6 to 50 mols of oxyalkylene per mol of monoalkylphenol, the alkyl group of the monoalkylphenol having from 4 to 14 carbon atoms; and a mixture of monoalkylphenol and dialkylphenol adducted with 1 to 2 weights of oxyalkylene per weight of said mono- and dialkylphenol mixture, the latter comprising a still bottoms derived by fractionating an alkylate product from a phenolalkylene alkylation step; the alkyl groups of the still bottoms mixture each having 4 to 14 carbon atoms; said oxyalkylene being selected from the group consisting of oxyethylene and oxypropylene, and mixtures thereof, the still bottoms adduct mixture being present in an amount within the range of 10 to 50 weight percent of the total weight of the still bottoms adduct mixture and the monoalkylphenol adduct; said emulsion having been formed and stabilized before any substantial quantity of clay or shale is suspended therein by virtue of the drilling operation.

29. The method of reducing the fluid loss of a water base mud containing earthen materials therein and also containing at least one of sodium chloride and calcium sulfate which comprises adding 5 to 50 volume percent of hydrocarbon oil to the base mud along with at least 0.5 pound per barrel of a surfactant selected from the group consisting of: (a) phenol adducted with at least 28 mols of an oxyalkylene per mol of phenol; (b) a monoalkylphenol adducted with 6 to 50 mols of an oxyalkylene per mol of monoalkylphenol, the alkyl group of the latter having from 4 to 14 carbon atoms; (c) a polyalkylphenol adducted with 12 to 50 mols of an oxyalkylene per mol of polyalkylphenol, the alkyl groups of the latter each having at least one carbon atom and together having from 3 to 28 carbon atoms; (d) a mixture of a monoalkylphenol and polyalkylphenol adducted with 2 to 4 weights of oxyalkylene per weight of said mixture, the alkyl groups of the monoalkylphenol and the polyalkylphenol each having 4 to 14 carbon atoms; (e) a sulfonated alkylphenol-oxyalkylene adduct containing 4 to 30 mols of oxyalkylene per mol of alkylphenol, the alkyl groups of the alkylphenol containing 6 to 14 carbon atoms; and (f) a naphthenic acid adducted with 15 to 50 mols of oxyalkylene per mol of naphthenic acid, the latter having a molecular weight in the range of 300 to 350; said oxyalkylene adducted with the selected surfactant being selected from the groups consisting of oxyethylene and oxypropylene and mixtures thereof.

30. The method of reducing the fluid loss of a water base mud containing earthen materials therein and also containing at least one of sodium chloride and calcium sulfate which comprises adding 5 to 50 volume percent of hydrocarbon oil to the base mud along with at least 0.5 lb./bbl. of a surfactant consisting of nonylphenol adducted with 12 to 50 mols of oxyethylene.

31. The method of reducing the fluid loss of a water base mud containing earthen materials therein and also containing at least one of sodium chloride and calcium sulfate which comprises adding 5 to 50 volume percent of hydrocarbon oil to the base mud along with at least 0.5 lb./bbl. of a surfactant consisting of a mixture of nonylphenol and dinonylphenol adducted with 2 to 4 weights of oxyethylene per weight of said mixture.

32. The method of reducing the fluid loss of a water base mud containing earthen materials therein and also containing at least one of sodium chloride and calcium sulfate which comprises adding 5 to 50 volume percent of hydrocarbon oil to the base mud along with at least 0.5 lb./bbl. of a surfactant consisting of a naphthenic acid adducted with about 30 mols of oxyethylene.

33. The method of reducing the fluid loss of a water base mud containing earthen materials therein and also containing at least one of sodium chloride and calcium sulfate which comprises adding 5 to 50 volume percent of hydrocarbon oil to the base mud along with at least 0.5 lb./bbl. of a surfactant consisting of dodecylphenol adducted with 12 to 50 mols of oxyethylene.

References Cited in the file of this patent

UNITED STATES PATENTS

| | | |
|---|---|---|
| 2,423,144 | Gregg | July 1, 1947 |
| 2,509,588 | Dawson | May 30, 1950 |
| 2,555,794 | Henkes | June 5, 1951 |
| 2,564,753 | Cox | Aug. 21, 1951 |
| 2,593,112 | Cross et al. | Apr. 15, 1952 |
| 2,689,219 | Menaul | Sept. 14, 1954 |

OTHER REFERENCES

Antarox A–200, pub. by General Aniline and Film Corp., N.Y., March 3, 1950, pages 2 to 5.